No. 612,403.  
W. H. CROSSLEY.  
BICYCLE BRAKE.  
(Application filed May 22, 1897.)  
Patented Oct. 18, 1898.

(No Model.)

Witnesses  
E. F. Monroe  
V. B. Hillyard

Inventor  
William H. Crossley  
By his Attorneys,  
C. A. Snow & Co.

United States Patent Office.

WILLIAM H. CROSSLEY, OF BLOOMSBURG, PENNSYLVANIA, ASSIGNOR OF ONE-HALF TO GEORGE W. MIFFLIN, OF SAME PLACE.

BICYCLE-BRAKE.

SPECIFICATION forming part of Letters Patent No. 612,403, dated October 18, 1898.

Application filed May 22, 1897. Serial No. 637,716. (No model.)

*To all whom it may concern:*

Be it known that I, WILLIAM H. CROSSLEY, a citizen of the United States, residing at Bloomsburg, in the county of Columbia and State of Pennsylvania, have invented a new and useful Bicycle-Brake, of which the following is a specification.

This invention provides a brake mechanism for bicycles, velocipedes, and road-machines of kindred nature which will admit of the machine being quickly brought to a stand when propelled rapidly without injuring the tire or producing the jar incident to a sudden application of the brake of brake mechanisms as generally constructed.

The improvement consists of the novel formation of the brake-shoe and the particular mountings for connecting it with the frame of the machine, the brake-shoe being of the rotary type and mounted so as to have its resistance to turning capable of being regulated, whereby the combined action of the tire against the shoe and the latter upon its journal is utilized to check the speed of the machine when the brake is set.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
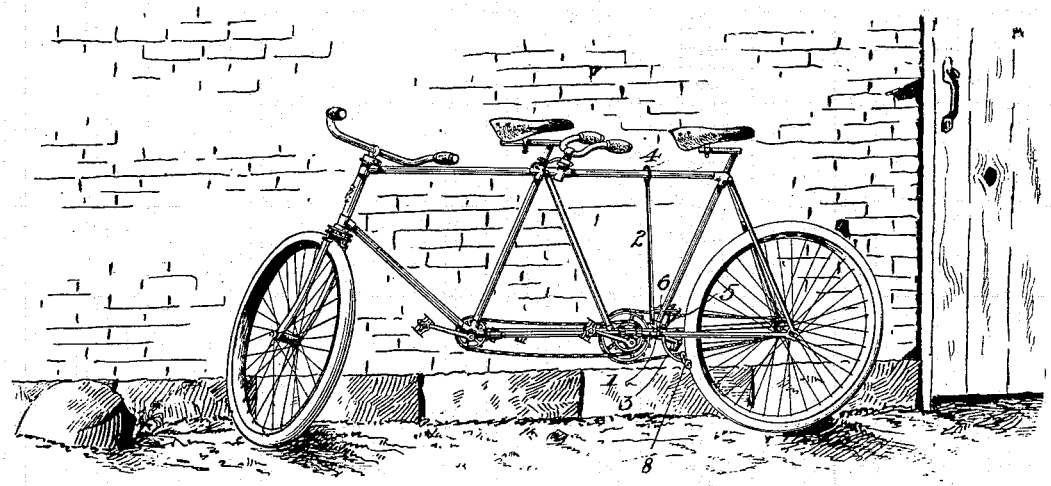
Figure 3:
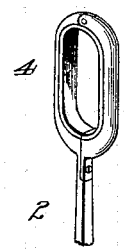
Figure 3:
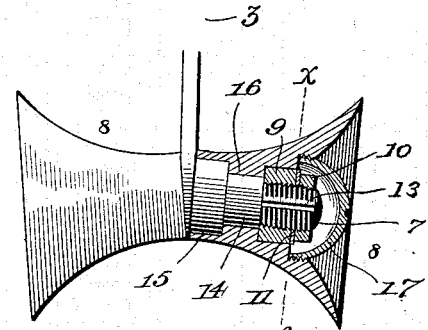
Figure 2:
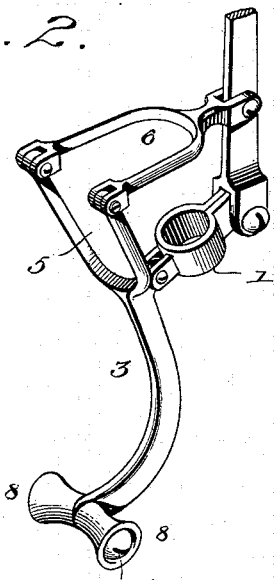
Figure 4:
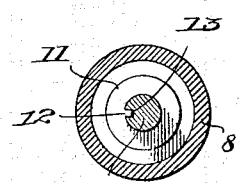

Figure 1 is a perspective view of a tandem, showing the application of the invention. Fig. 2 is a perspective view of the brake mechanism detached from the machine and illustrated on a larger scale. Fig. 3 is a detail view in elevation of the improved brake-shoe, an element or end portion being in section. Fig. 4 is a cross-section on the line X X of Fig. 3, looking to the left.

Corresponding and like parts are referred to in the following description and indicated in the several views of the drawings by the same reference characters.

The brake mechanism will be applied to any convenient portion of the machine-frame, so as to admit of the brake-shoe being brought against the tire of the wheel with sufficient force upon operating the lever to attain the desired end. As indicated, the brake is secured to the seat-post tube by means of a clip 1, which is provided with oppositely-extending lugs, to which the lever 2 and arm 3 are pivotally connected. The clip 1 may be of any desired construction, so as to admit of it being easily and firmly secured to the desired frame-bar of the machine, and the parts 2 and 3 may be pivotally connected therewith in any manner found most advantageous. The lever 2 is pivotally connected at its lower end with the clip, and its upper end is formed with a loop 4 to receive the top bar of the machine-frame, by which it is held in place and directed in its movements. The loop is padded or covered, so as to prevent injurious contact with the frame-bar passing therethrough. The arm 3 is curved or elbow-shaped and is pivotally connected about midway of its ends to the clip 1 and is provided at its lower end with the brake-shoe 5 and has connection at its upper end with the lever 2 by means of a link 6, which is forked at its outer end to embrace the sides of the seat-post tube, so as to distribute the strain equally upon opposite sides thereof. The upper end of the arm 3 is forked, and corresponding members of the link and arm are pivotally connected together. The parts are disposed so that under normal conditions the brake-shoe stands away from the rear or drive wheel, and upon moving the upper end of the lever 2 forward the brake-shoe will be brought into engagement with the drive-wheel and check the speed of the machine.

The lower end of the arm 3 is provided with a spindle or journal 7 at each side, and upon these spindles or journals are mounted spools 8, constituting the complementary parts of the rotary brake-shoe. The spindles or journals 7 are oppositely disposed and incline at their outer ends to bring the inner ends of the spools together at the point where they engage with the wheel, so as to present a continuous and unbroken surface, whereby injury to the tire is obviated. The outer end of each spindle or journal is threaded to receive a friction-nut 9 and a jam-nut 10, a washer 11 being interposed between the friction and jam nuts and prevented from turning by having a projecting portion 12 entering a longitudinal groove 13 in the side of the threaded portion of the journal. Each journal is enlarged adjacent to the threaded portion, as shown at 14, forming a shoulder at the base of the threaded end portion, and is provided at its inner end with an annular shoulder 15 of greater diameter than the part 14, between which and the friction-nut 9 an inner annular extension 16 of the spool is confined with sufficient friction to prevent the free rotation of the spool upon the journal, the degree of friction being regulated by turning the friction-nut more or less tightly against the part 16. The spools or rotary brake-shoes are approximately of conical form, and are placed with their smaller ends inward and their flaring ends outward, and have their base portions bell-shaped, so as to receive the friction and jam nuts, and the cap 17 protecting them and closing the projecting end of the journal from view, said cap being externally screw-threaded and detachably connected with the spool, so as to admit of the friction and jam nuts being accessible for increasing or decreasing the friction of the spool upon its journal.

Upon setting the brake the shoe is forced against the rim of the wheel, and upon the application of sufficient force the component parts of the brake-shoe are caused to rotate upon their respective journals, and the friction between the spools and their journals and between the wheel and the said spools results in checking the momentum of the machine and bringing it to a stop without causing any jar to the rider or injury to the wheel.

Having thus described the invention, what is claimed as new is—

1. A brake mechanism to be removably applied to a bicycle, consisting of a clip to be attached to a frame-bar of the machine, a lever fulcrumed to the clip and bearing a brake-shoe at one end and having its opposite end forked, a hand-lever pivoted to the said clip and having a loop at its upper or free end to encircle a reach-bar, and a link having one end pivoted to the hand-lever and having its opposite end forked and pivoted to the fork members of the brake-lever, substantially as described.

2. A brake mechanism for bicycles and like road-machines, comprising a clip having oppositely-extending lugs, a curved arm pivoted intermediate of its ends to one of the lugs of the clip and bearing a brake-shoe at one end, a lever pivoted at one end to the other lug of the clip and having its free end formed with a loop to embrace a frame-bar of the machine, and a link connecting the free end of the pivoted arm with the lever, substantially in the manner set forth for the purpose described.

3. In a brake mechanism for bicycles and like road-machines, the combination of an arm having oppositely-extending journals inclining at their outer ends toward the wheel and spools mounted upon the journals and having their outer ends separated and their inner ends touching on a line corresponding with the active portion of the brake-shoe, whereby the engaging surface is practically continuous, substantially as and for the purpose set forth.

4. In a brake mechanism, the combination of a journal having a shoulder at its inner end and its outer portion threaded and longitudinally grooved, a spool mounted upon the journal and having the end portions of its bore enlarged, the inner enlargement receiving the aforesaid shoulder, a friction-nut mounted upon the threaded portion of the journal and entering the outer enlargement of the spool, a jam-nut mounted upon the threaded extremity of the journal, and a washer interposed between the friction and jam nuts and having a projecting portion to enter the longitudinal groove, substantially as specified.

5. In a brake mechanism, an arm having oppositely-extending journals inclining at their outer ends toward the wheel, and having shoulders at their inner ends and their outer ends threaded, spools of approximately conical form placed upon the journals with their smaller ends opposite each other and separated at a point remote from the wheel, and touching at a point opposite the wheel to provide a continuous surface, friction and jam nuts mounted upon the threaded extremities of the journals and adapted to hold the spools in place and secure any desired amount of resistance to their rotation, and caps applied to the outer ends of the spools to exclude foreign matter from the journals, substantially as set forth.

In testimony that I claim the foregoing as my own I have hereto affixed my signature in the presence of two witnesses.

WILLIAM H. CROSSLEY.

Witnesses:
 JOHN H. SIGGERS,
 FRANCES PEYTON SMITH.